(12) United States Patent
Park

(10) Patent No.: US 12,391,307 B2
(45) Date of Patent: Aug. 19, 2025

(54) STEERING APPARATUS AND METHOD OF CONTROLLING THE SAME

(71) Applicant: HL MANDO CORPORATION, Pyeongtaek-si (KR)

(72) Inventor: Jihoon Park, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 125 days.

(21) Appl. No.: 18/380,812

(22) Filed: Oct. 17, 2023

(65) Prior Publication Data
US 2024/0317299 A1 Sep. 26, 2024

(30) Foreign Application Priority Data

Mar. 22, 2023 (KR) .................. 10-2023-0037569

(51) Int. Cl.
B62D 5/04 (2006.01)
B62D 3/12 (2006.01)
B62D 15/02 (2006.01)

(52) U.S. Cl.
CPC ........... *B62D 5/0463* (2013.01); *B62D 3/126* (2013.01); *B62D 15/0225* (2013.01)

(58) Field of Classification Search
CPC .. B62D 5/0463; B62D 3/126; B62D 15/0225; B62D 6/008; B62D 5/046; B62D 5/006; B62D 5/0421; B62D 5/0481; B62D 5/0403; B60Q 9/00; B60R 16/0232; B60Y 2306/15; B60Y 2400/90
See application file for complete search history.

(56) References Cited

U.S. PATENT DOCUMENTS

| | | | |
|---|---|---|---|
| 10,946,894 B2 | 3/2021 | Pramod et al. | |
| 2005/0178609 A1* | 8/2005 | Uryu | B62D 5/0481 180/446 |
| 2006/0009894 A1* | 1/2006 | Goto | B62D 6/003 701/41 |
| 2006/0011404 A1* | 1/2006 | Goto | B62D 6/002 180/402 |
| 2008/0251312 A1* | 10/2008 | Goto | B62D 6/003 180/446 |
| 2012/0035810 A1* | 2/2012 | Mukai | B62D 5/0481 701/41 |

(Continued)

FOREIGN PATENT DOCUMENTS

JP 2001-191930 A 7/2001

*Primary Examiner* — Joseph J Dallo
(74) *Attorney, Agent, or Firm* — Hauptman Ham, LLP

(57) ABSTRACT

A steering apparatus includes a steering wheel provided in a vehicle, a feedback motor including a rotation shaft connected to the steering wheel, an angle sensor configured to output an angle signal corresponding to rotation displacement of the steering wheel, a rack bar connected to a rotation shaft of the wheel provided in the vehicle, a steering motor including a rotation shaft connected to the rack bar, a position sensor configured to output a position signal corresponding to linear displacement of the rack bar assembly, and a processor configured to control the steering motor to linearly move the rack bar based on the angle signal, identify a rack force applied to the rack bar based on the position signal, and control the feedback motor to apply a feedback torque corresponding to the rack force applied to the rack bar to the steering wheel.

20 Claims, 8 Drawing Sheets

(56) References Cited

U.S. PATENT DOCUMENTS

| | | | |
|---|---|---|---|
| 2012/0055730 A1* | 3/2012 | Mukai | B62D 5/008 |
| | | | 180/444 |
| 2016/0001815 A1* | 1/2016 | Sasaki | B62D 5/0487 |
| | | | 701/41 |
| 2019/0185052 A1* | 6/2019 | Yoshida | B62D 5/0496 |
| 2019/0367084 A1* | 12/2019 | Hong | B62D 6/008 |
| 2021/0403085 A1* | 12/2021 | Hong | B62D 6/10 |
| 2022/0144295 A1* | 5/2022 | Hwang | B60W 50/12 |
| 2023/0014650 A1* | 1/2023 | Kim | B62D 5/006 |

* cited by examiner

STEERING APPARATUS AND METHOD OF CONTROLLING THE SAME

CROSS-REFERENCE TO RELATED APPLICATION

This application claims the benefit of Korean Patent Application No. 10-2023-0037569, filed on Mar. 22, 2023 in the Korean Intellectual Property Office, the disclosure of which is incorporated herein by reference.

TECHNICAL FIELD

Embodiments of the present disclosure relate to a steering apparatus driven by a motor and a method of controlling the same.

BACKGROUND

Steering apparatuses detect a steering torque generated by the rotation of a steering wheel and control a motor to supply an auxiliary steering torque proportional to the detected steering torque so that steering control of a vehicle may be performed.

Conventionally, steering apparatuses are formed so that a steering torque generated by the rotation of a steering wheel is transmitted to a rack bar via a rack-pinion mechanical unit, and an auxiliary steering torque generated by a motor is transmitted to the rack bar according to the steering torque generated by the rotation of the steering wheel. That is, the steering torque generated by the steering wheel and the auxiliary steering power generated by the motor are combined to axially move the rack bar.

However, recently, steering-by-wire (SBW) type steering apparatuses have been developed for allowing a rack bar to axially move using only a torque of a motor without a mechanical connection between a steering wheel and the rack bar.

In such steering apparatuses, frictional forces between various members of a mechanical unit constituting the apparatus can decrease or increase as a traveling distance of a vehicle increases. For example, the frictional forces between various members of the mechanical unit may be reduced due to a phenomenon in which a rack-and-pinion mechanical unit, a reducer, etc. are worn or loosened. In addition, rust may occur on the rack-and-pinion mechanical unit, the reducer, etc., thereby increasing the frictional forces between various members of the mechanical unit.

The increase or decrease in the frictional forces between the internal members of the electric power steering apparatus may cause a driver to feel a sense of steering different from a sense of steering at the time of the initial use of the steering apparatus.

SUMMARY

Therefore, it is an aspect of the present disclosure to provide a steering apparatus capable of detecting changes in frictional forces between internal members, and a method of controlling the same.

Additional aspects of the disclosure will be set forth in part in the description which follows and, in part, will be obvious from the description, or may be learned by practice of the disclosure.

In accordance with one aspect of the present disclosure, a steering apparatus includes a feedback motor including a rotation shaft connected to a steering wheel provided in a vehicle, an angle sensor configured to output an angle signal corresponding to a rotation displacement of the steering wheel, a steering motor including a rotation shaft connected to a rack bar provided in the vehicle, a position sensor configured to output a position signal corresponding to a linear displacement of the rack bar, and at least one processor control the steering motor to linearly move the rack bar based on predetermined target positions, identify a rack force applied to the rack bar based on the position signal of the position sensor, control the feedback motor based on a predetermined feedback torque, identify a feedback torque applied to the steering wheel based on the angle signal of the angle sensor, and provide an output device of the vehicle with an electrical signal indicating whether an increase in a frictional force of at least one of the rack bar or the steering wheel occurs based on the identified rack force and the identified feedback torque.

The at least one processor may identify the increase in the frictional force of the rack bar based on the identified rack force being greater than a predetermined reference rack force, and identify the increase in the frictional force of the steering wheel based on the identified feedback torque being greater than a predetermined reference feedback torque.

The at least one processor may provide the electrical signal to the output device to output a message warning of a low temperature causing the increases in the frictional forces of the rack bar and the steering wheel based on the identified rack force being greater than a predetermined reference rack force and the identified feedback torque being greater than a predetermined reference feedback torque.

The at least one processor may provide the electrical signal to the output device to output a message warning of introduction of foreign substances into the rack bar based on the identified rack force being greater than a predetermined reference rack force and the identified feedback torque being not greater than a predetermined reference feedback torque.

The at least one processor may provide the electrical signal to the output device to output a message warning of a mechanical defect of the steering wheel based on the identified rack force being not greater than a predetermined reference rack force and the identified feedback torque being greater than a predetermined reference feedback torque.

The at least one processor may identify a normal operation of the steering apparatus based on the identified rack force being not greater than a predetermined reference rack force and the identified feedback torque being not greater than a predetermined reference feedback torque.

The predetermined target positions may include target positions whose displacements from an origin change in a form of a triangular or trapezoidal. The predetermined feedback torque may include a feedback torque whose magnitude changes in a form of a triangular or trapezoidal.

The at least one processor may include a first processor electrically connected to the feedback motor and the angle sensor, and a second processor electrically connected to the steering motor and the position sensor. The first processor may communicate with the second processor.

In accordance with another aspect of the present disclosure, a method of controlling a steering apparatus including a steering wheel provided in a vehicle and a rack bar connected to a rotation shaft of the wheel provided in the vehicle includes controlling a linear movement of the rack bar based on predetermined target positions, identifying a rack force applied to the rack bar based on a position signal of a position sensor, the position sensor configured to output the position signal corresponding to a linear displacement of the rack bar, controlling rotation of the steering wheel based on a predetermined feedback torque, identifying a feedback torque applied to the steering wheel based on an angle signal of an angle sensor, the angle sensor configured to output the angle signal corresponding to a rotation displacement of the steering wheel, and providing an output device of the vehicle with an electrical signal indicating whether an increase in a frictional force of at least one of the rack bar or the steering wheel occurs based on the identified rack force and the identified feedback torque.

The providing of the electrical signal corresponding to the increase in the frictional force of the at least one of the rack bar or the steering wheel may include identifying the increase in the frictional force of the rack bar based on the identified rack force being greater than a predetermined reference rack force, and identifying the increase in the frictional force of the steering wheel based on the identified feedback torque being greater than a predetermined reference feedback torque.

The method may further include providing the electrical signal to the output device to output a message warning of a low temperature causing the increases in the frictional forces of the rack bar and the steering wheel based on the identified rack force being greater than a predetermined reference rack force and the identified feedback torque being greater than a predetermined reference feedback torque.

The method may further include providing the electrical signal to the output device to output a message warning of introduction of foreign substances into the rack bar based on the identified rack force being greater than a predetermined reference rack force and the identified feedback torque being not greater than a predetermined reference feedback torque.

The method may further include providing the electrical signal to the output device to output a message warning of a mechanical defect of the steering wheel based on the identified rack force being not greater than a predetermined reference rack force and the identified feedback torque being greater than a predetermined reference feedback torque.

The method may further include identifying that a normal operation of the steering apparatus based on the identified rack force being not greater than a predetermined reference rack force and the identified feedback torque being not greater than a predetermined reference feedback torque.

In accordance with still another aspect of the present disclosure, a steering apparatus includes a steering wheel actuator, and a steering rack actuator. The steering wheel actuator includes a feedback motor including a rotation shaft connected to a steering wheel provided in a vehicle, an angle sensor configured to output an angle signal corresponding to a rotation displacement of the steering wheel, and a first processor configured to transmit a target position corresponding to the angle signal to the steering rack actuator and control the feedback motor to apply a feedback torque corresponding to a rack force of the steering wheel actuator to the steering wheel. The steering rack actuator includes a steering motor including a rotation shaft connected to a rack bar provided in the vehicle, a position sensor configured to output a position signal corresponding to a linear displacement of the rack bar assembly, and a second processor configured to control the steering motor to linearly move the rack bar based on the target position and identify a rack force applied to the rack bar based on the position signal. The first processor controls the feedback motor based on a predetermined feedback torque and provides an electrical signal indicating whether an increase in a frictional force of the steering wheel occurs to an output device of the vehicle based on a feedback torque value identified based on the angle signal. The second processor controls the steering motor based on a predetermined target position and provides an electrical signal indicating whether an increase in a frictional force of the rack bar occurs to the output device of the vehicle based on a rack force value identified based on the position signal.

A non-transitory computer readable medium storing a computer program, when executed by a processor, to cause the processor to: control a steering motor to linearly move a rack bar based on predetermined target positions; determine a rack force applied to the rack bar based on a position signal, indicating a linear displacement of the rack bar, received from a position sensor; control a feedback motor to rotate a rotation shaft connected to a steering wheel based on a predetermined feedback torque; determine a feedback torque applied to the steering wheel based on an angle signal, indicating a rotation displacement of the steering wheel, received from an angle sensor; and control an output device to output information indicating whether an increase in a frictional force of at least one of the rack bar or the steering wheel occurs based on the determined rack force and the determined feedback torque.

The computer program, when executed by the processor, further causes the processor to: determine the increase in the frictional force of the rack bar based on the determined rack force being greater than a predetermined reference rack force; and determine the increase in the frictional force of the steering wheel based on the determined feedback torque being greater than a predetermined reference feedback torque.

The computer program, when executed by the processor, further causes the processor to control the output device to output a message warning of a low temperature causing the increases in the frictional forces of the rack bar and the steering wheel based on the determined rack force being greater than a predetermined reference rack force and the determined feedback torque being greater than a predetermined reference feedback torque.

The computer program, when executed by the processor, further causes the processor to control the output device to output a message warning of introduction of foreign substances into the rack bar based on the determined rack force being greater than a predetermined reference rack force and the determined feedback torque being not greater than a predetermined reference feedback torque.

The computer program, when executed by the processor, further causes the processor to control the output device to output a message warning of a mechanical defect of the steering wheel based on the determined rack force being not greater than a predetermined reference rack force and the determined feedback torque being greater than a predetermined reference feedback torque.

The computer program, when executed by the processor, further causes the processor to control the output device to output a message indicating a normal state of the steering wheel and the rack bar based on the determined rack force being not greater than a predetermined reference rack force and the determined feedback torque being not greater than a predetermined reference feedback torque.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The same reference numbers indicate the same components throughout the specification. The present specification does not describe all elements of embodiments, and general contents or overlapping contents between the embodiments in the technical field to which the disclosure pertains will be omitted. Terms "unit, module, member, and block" used in the specification may be implemented as software or hardware, and according to the embodiments, a plurality of "units, modules, members, and blocks" may be implemented as one component, or one "unit, module, member, and block" may also include a plurality of components.

Throughout the specification, when a certain portion is described as being "connected" to another, this includes both a case in which the certain portion is directly connected to another and a case in which the certain portion is indirectly connected to another, and the indirect connection includes connection through a wireless communication network.

In addition, when a certain portion is described as "including" a certain component, this means further including other components rather than excluding other components unless especially stated otherwise.

Throughout the specification, when a certain member is described as being positioned "on" another, this includes both a case in which the certain member is in contact with another and a case in which other members are present between the two members.

Terms such as first and second are used to distinguish one component from another, and the components are not limited by the above-described terms.

A singular expression includes plural expressions unless the context clearly dictates otherwise.

In each operation, identification symbols are used for convenience of description, and the identification symbols do not describe the sequence of each operation, and each operation may be performed in a different sequence from the specified sequence unless a specific sequence is clearly described in context.

Hereinafter, an operation principle and embodiments of the present disclosure will be described with reference to the accompanying drawings.

Figure 1:
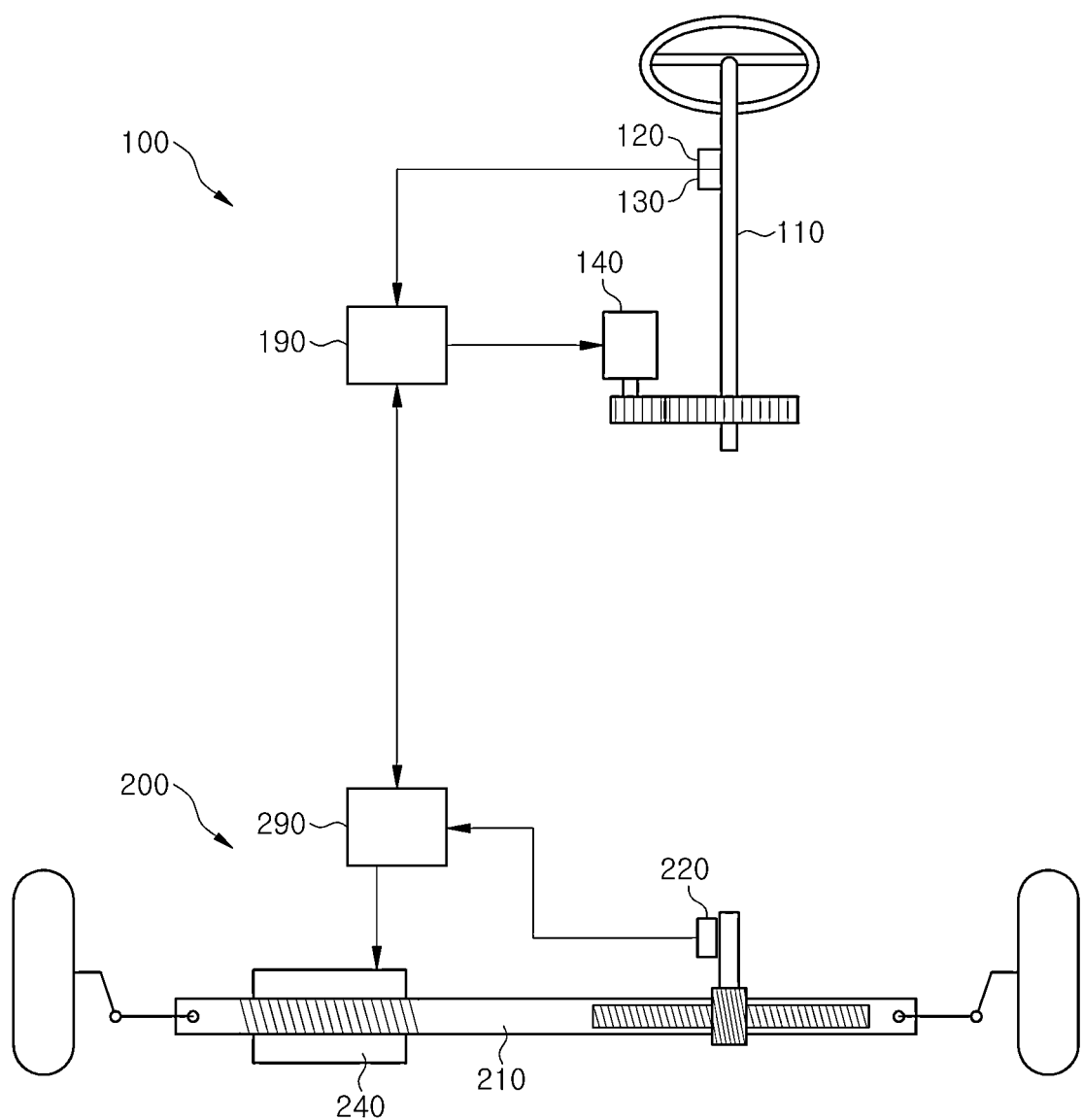
FIG. 1 is a view illustrating one example of a steering apparatus according to one embodiment.
Figure 2:
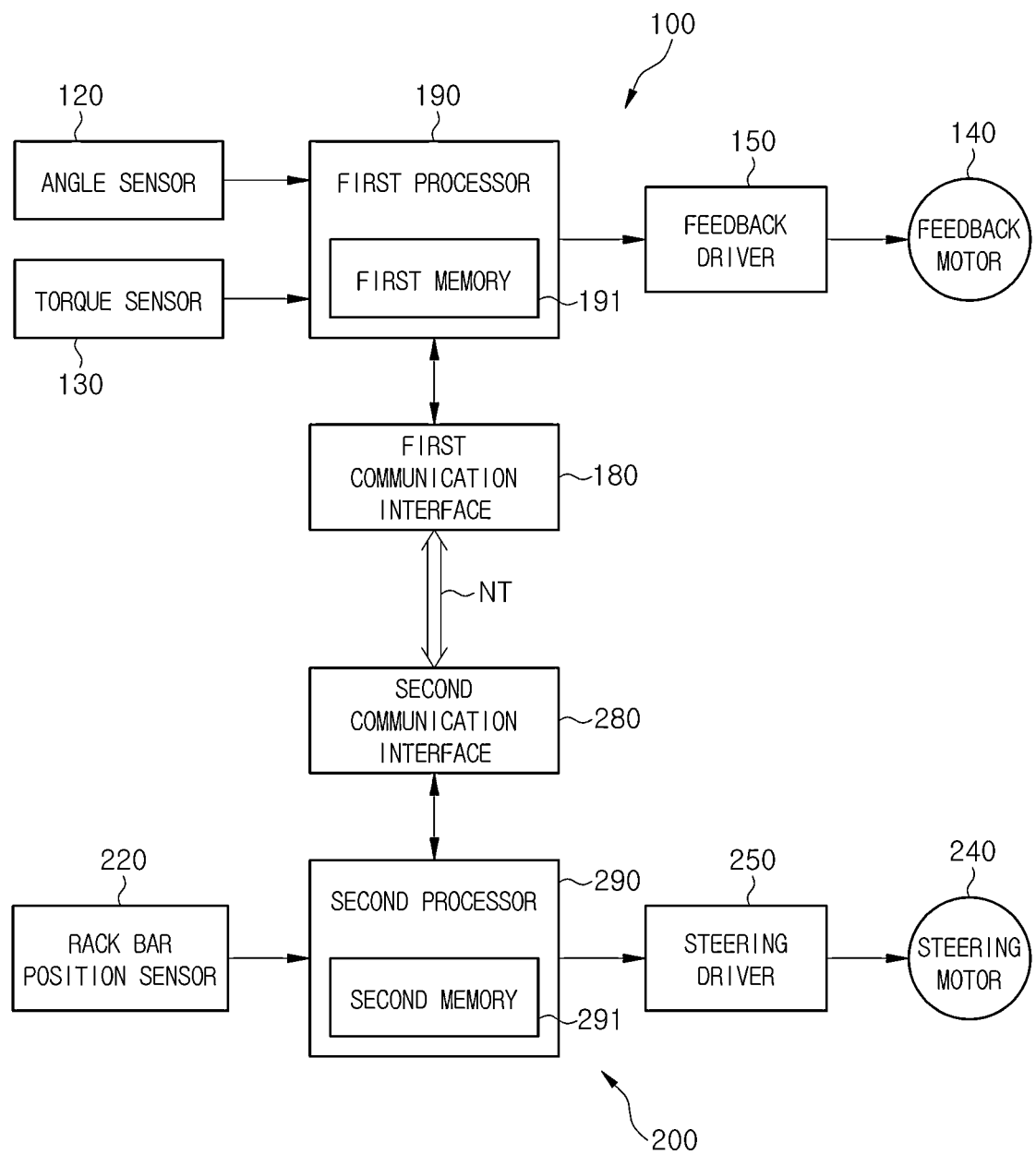
FIG. 2 is a view illustrating one example of a control configuration of the steering apparatus according to one embodiment.

FIG. 1 is a view illustrating one example of the steering apparatus according to one embodiment. FIG. 2 is a view illustrating one example of a control configuration of the steering apparatus according to one embodiment.

A steering apparatus 10 may acquire a driver's steering intention through a steering wheel and change a traveling direction of a vehicle according to the acquired steering intention. For example, the steering apparatus 10 may change a direction of a rotation shaft of the wheel according to the driver's steering intention.

For example, as illustrated in FIGS. 1 and 2, the steering apparatus 10 may include a steering wheel actuator 100 and a steering rack actuator 200.

The steering wheel actuator 100 may be only electrically connected to the steering rack actuator 200 without being mechanically or fluidically connected thereto.

The steering wheel actuator 100 may acquire the driver's steering intention through the steering wheel. In addition, the steering wheel actuator 100 may provide the steering wheel with a feedback torque corresponding to a rack force acting on wheels of the vehicle.

As illustrated in FIGS. 1 and 2, the steering wheel actuator 100 may include a steering wheel assembly 110, an angle sensor 120, a torque sensor 130, a feedback motor 140, a feedback driver 150, a first communication interface 180, and a first processor 190. The steering wheel assembly 110, the angle sensor 120, the torque sensor 130, the feedback motor 140, the feedback driver 150, the first communication interface 180, and the first processor 190 do not correspond to essential components of the steering wheel actuator 100, and at least some thereof may be omitted.

The steering wheel assembly 110 may include a steering wheel for acquiring a driver's input related to a traveling direction of a vehicle or a driver's steering intention (hereinafter referred to as "steering input") and a steering column for supporting the steering wheel. The steering wheel assembly 110 may rotate clockwise or counterclockwise according to the driver's steering input.

The angle sensor 120 may detect the rotation of the steering wheel assembly 110 by the driver and measure a rotation angle of the steering wheel assembly 110. The angle sensor 120 may provide the first processor 190 with an electrical signal (hereinafter referred to as "angle signal") corresponding to the measured rotation angle.

The torque sensor 130 may detect the rotation of the steering wheel assembly 110 and measure a torque applied to the steering wheel assembly 110 by the driver. The torque sensor 130 may provide the first processor 190 with an electrical signal (hereinafter referred to as "torque signal") corresponding to the measured torque.

The feedback motor 140 may be connected to the steering wheel assembly 110 through a reducer and may provide a feedback torque to the steering wheel assembly 110. The reducer may include, for example, a pulley-belt or a plurality of gears.

The feedback motor 140 may include a rotation shaft connected to the steering wheel assembly 110 through the reducer, a rotor connected to the rotation shaft, and a stator fixed to a housing. For example, the rotor may include permanent magnets of which N poles and S poles are alternately arranged along an outer surface thereof, and the stator may include a plurality of teeth arranged along the outer surface of the rotor and a plurality of coils surrounding each of the plurality of teeth.

The rotor may rotate by magnetic interaction with the stator, and the rotation of the rotor may be provided to the rotation shaft. The feedback motor 140 may receive a driving current controlled by the feedback driver 150. The plurality of coils included in the stator may form magnetic fields rotating around the rotor by the driving current, and the rotor may rotate by magnetic interaction between a magnetic field of the rotor and a magnetic field of the stator.

The feedback driver 150 may control the driving current supplied to the feedback motor 140 according to a feedback control signal of the first processor 190. For example, the feedback driver 150 may include a 3-phase inverter (or an H-bridge) including a plurality of switching elements for controlling the driving current supplied to the feedback motor 140 and gate drivers for controlling the switching elements included in the 3-phase inverter (or the H-bridge) according to the feedback control signal of the first processor 190. The gate driver may provide a driving signal for driving the 3-phase inverter (or the H-bridge) according to the feedback control signal of the first processor 190 to the switching elements of the 3-phase inverter (or the H-bridge). The 3-phase inverter (or the H-bridge) may convert a direct current (DC) power supplied from a battery of the vehicle into an alternating current (AC) power according to the driving signal of the gate driver and provide the converted AC power to the feedback motor 140.

The first communication interface 180 may transmit and receive communication signals with the steering rack actuator 200 via a communication network NT. For example, the first communication interface 180 may acquire a transmission signal from the first processor 190 and transmit the transmission signal to the steering rack actuator 200 via the vehicle communication network NT. In addition, the first communication interface 180 may acquire a reception signal from the steering rack actuator 200 via the vehicle communication network NT and provide the reception signal to the first processor 190.

The first communication interface 180 may include, for example, a controller area network (CAN) transceiver for transmitting and receiving signals using a CAN protocol.

The first processor 190 may provide control signals for controlling the steering wheel actuator 100 according to the driver's steering intention.

The first processor 190 may include a first memory 191 storing programs and data for implementing control of the steering wheel actuator 100.

The first memory 191 may provide the stored programs and data to the first processor 190 and store temporary data generated during operation of the first processor 190. The first memory 191 may include, for example, volatile memories such as a static random access memory (SRAM) and a dynamic RAM (DRAM) and non-volatile memories such as a read only memory (ROM), an erasable programmable ROM (EPROM), a flash memory, etc.

The first processor 190 may be electrically connected to the angle sensor 120, the torque sensor 130, the first communication interface 180, the feedback driver 150, and/or the feedback motor 140.

The first processor 190 may process an angle signal of the angle sensor 120 and/or a torque signal of the torque sensor 130. The first processor 190 may identify the driver's steering intention based on a result of processing the angle signal and/or the torque signal. In addition, the first processor 190 may identify a target position of the rack bar included in the steering rack actuator 200 corresponding to the driver's steering intention.

The first processor 190 may provide communication signals corresponding to the target position to the first communication interface 180 to transmit the target position to the steering rack actuator 200 via the communication network NT.

In addition, the first processor 190 may acquire communication signals, which correspond to the rack force received from the steering rack actuator 200 via the communication network NT, from the first communication interface 180. The first processor 190 may identify the rack force based on a result of processing the received communication signal.

The first processor 190 may identify a feedback torque corresponding to the rack force and provide the feedback control signal to the feedback driver 150 so that the feedback motor 140 generates the feedback torque corresponding to the rack force. The feedback driver 150 may control the driving current supplied to the feedback motor 140 according to the feedback control signal. The feedback motor 140 may provide the feedback torque corresponding to the rack force to the steering wheel assembly 110.

The steering rack actuator 200 may be only electrically connected to the steering wheel actuator 100 without being mechanically or fluidically connected thereto.

The steering rack actuator 200 may move the rack bar to steer the vehicle according to the driver's steering intention. In addition, the steering rack actuator 200 may identify the rack force applied to the rack bar.

As illustrated in FIGS. 1 and 2, the steering rack actuator 200 may include a rack bar assembly 210, a steering motor 240, a steering driver 250, a rack bar position sensor 220, a second communication interface 280, and a second processor 290. The rack bar assembly 210, the steering motor 240, the steering driver 250, the rack bar position sensor 220, the second communication interface 280, and the second processor 290 do not correspond to essential components of the steering rack actuator 200, and at least some thereof may be omitted.

The rack bar assembly 210 may be connected to the rotation shaft of the wheel and may linearly move by driving the steering motor 240. The rack bar assembly 210 may change a direction of the rotation shaft of the wheel in order to change the traveling direction of the vehicle. For example, the rack bar assembly 210 may linearly move to rotate the rotation shaft of the wheel counterclockwise, and thus the vehicle may turn leftward. In addition, the rack bar assembly 210 may linearly move to rotate the rotational shaft of the wheel clockwise, and thus the vehicle may turn rightward.

The steering motor 240 may be connected to the rack bar assembly 210 through the reducer and may provide a torque for linearly moving the rack bar assembly 210. The reducer may include, for example, a pulley-belt or a plurality of gears.

The steering motor 240 may provide a rotation force for linearly moving the rack bar assembly 210 leftward or rightward according to a steering control signal of the second processor 290. The rotation of the steering motor 240 may be converted into a linear motion through, for example, a rack gear and a pinion gear.

The steering motor 240 may include a rotation shaft connected to the rack bar assembly 210 through the reducer, a rotor connected to the rotation shaft, and a stator fixed to a housing. A structure of the steering motor 240 is similar to that of the feedback motor 140, and a detailed description of the steering motor 240 is replaced with the description of the feedback motor 140.

The steering driver 250 may control a driving current supplied to the steering motor 240 according to the steering control signal of the second processor 290. For example, the steering driver 250 may include a 3-phase inverter (or an H-bridge) including a plurality of switching elements for controlling the driving current supplied to the steering motor 240 and gate drivers for controlling the switching elements included in the 3-phase inverter (or the H-bridge) according to the steering control signal of the second processor 290.

The gate driver may provide a driving signal for driving the 3-phase inverter (or the H-bridge) according to the steering control signal of the second processor 290 to the switching elements of the 3-phase inverter (or the H-bridge). The 3-phase inverter (or the H-bridge) may convert a DC power supplied from the battery of the vehicle into an AC power according to the driving signal of the gate driver and provide the converted AC power to the steering motor 240.

The rack bar position sensor 220 may detect a linear motion of the rack bar assembly 210 and measure displacement of the rack bar assembly 210. For example, the linear motion of the rack bar assembly 210 may be converted into a rotation motion through a power converter, and the rack bar position sensor 220 may measure displacement of the converted rotation motion. The rack bar position sensor 220 may provide the second processor 290 with an electrical signal (position signal) corresponding to the measured displacement of the rack bar assembly 210.

The second communication interface 280 may transmit and receive communication signals with the steering wheel actuator 100 via the communication network NT. For example, the second communication interface 280 may acquire a transmission signal from the second processor 290 and transmit the transmission signal to the steering wheel actuator 100 via the vehicle communication network NT. In addition, the second communication interface 280 may acquire a reception signal from the steering wheel actuator 100 via the vehicle communication network NT and provide the reception signal to the second processor 290.

The second communication interface 280 may include, for example, a CAN transceiver for transmitting and receiving signals using a CAN protocol.

The second processor 290 may provide control signals for controlling the steering rack actuator 200 according to the driver's steering intention.

The second processor 290 may include a second memory 291 for storing programs and data for implementing control of the steering rack actuator 200.

The second memory 291 may provide the stored programs and data to the second processor 290 and store temporary data generated during operation of the second processor 290. The second memory 291 may include, for example, volatile memories such as an SRAM and a DRAM and non-volatile memories such as a ROM, an EPROM, a flash memory, etc.

The second processor 290 may be electrically connected to the second communication interface 280, the steering driver 250, the steering motor 240, and/or the rack bar position sensor 220.

The second processor 290 may acquire communication signals, which correspond to the target position received from the steering wheel actuator 100 via the communication network NT, from the second communication interface 280. The second processor 290 may identify the target position of the rack bar assembly 210 based on a result of processing the communication signals.

The second processor 290 may provide the steering control signal to the steering driver 250 to move the rack bar assembly 210 to the target position. The steering driver 250 may control the driving current supplied to the steering motor 240 according to the steering control signal. The steering motor 240 may provide a torque for moving the rack bar assembly 210 to the target position.

The second processor 290 may process a position signal of the rack bar position sensor 220. The second processor 290 may identify a position, a speed, and/or an acceleration of the rack bar assembly 210 based on a result of processing the position signal.

The second processor 290 may identify a rack force applied to the rack bar assembly 210 from the outside such as tires of wheels based on the position, speed, and/or acceleration of the rack bar assembly 210.

For example, the second processor 290 may identify a restoring force of the rack bar assembly 210 and acquire the rack force by reflecting the restoring force of the rack bar assembly 210 in an equation of motion.

The second processor 290 may identify an estimated position based on an output of the motor position sensor for measuring rotation displacement of the steering motor 240, identify a measured position based on an output of the rack bar position sensor 220 for measuring a position of the rack bar assembly, and identify a restoring force based on a product of a difference between the estimated position and the measured position and a modulus of elasticity of the reducer.

The second processor 290 may acquire the rack force by reflecting the restoring force of the rack bar assembly 210 in the equation of motion of the rack bar assembly 210.

For example, as expressed in Equation 1, a product of a restoring force $F_b$ of the rack bar assembly 210 and a reduction ratio R of the reducer may be equal to the sum of a rack force $F_{road}$ of the rack bar assembly 210, a frictional force $F_{fric}$ of the rack bar assembly 210, and an inertial force of the rack bar assembly 210. In this case, the inertial force of the rack bar assembly 210 may be expressed as a product of a mass M of the rack bar assembly 210 and an acceleration a of the rack bar assembly 210.

$$F_b \times R = F_{road} + F_{fric} + Ma \qquad [\text{Equation 1}]$$

Here, $F_b$ denotes the restoring force of the rack bar assembly 210, R denotes the reduction ratio of the reducer, $F_{road}$ denotes the rack force of the rack bar assembly 210, $F_{fric}$ denotes the frictional force of the rack bar assembly 210, M denotes the mass of the rack bar assembly 210, and a denotes the acceleration of the rack bar assembly 210.

In Equation 1, the restoring force $F_b$ of the rack bar assembly 210 may be calculated based on the output of the motor position sensor of the steering motor 240 and the output of the rack bar position sensor 220. The reduction ratio R of the reducer and the mass M of the rack bar assembly 210 are predetermined. The acceleration a of the rack bar assembly 210 may be calculated based on the output of the rack bar position sensor 220. In addition, the frictional force $F_{fric}$ of the rack bar assembly 210 may be measured in advance.

Therefore, the second processor 290 may acquire the rack force $F_{road}$ based on the restoring force $F_b$, the reduction ratio R, the frictional force $F_{fric}$, the mass M, and the acceleration a of the rack bar assembly 210 using Equation 2.

$$F_{road} = F_b \times R - F_{fric} - Ma \qquad [\text{Equation 2}]$$

Here, $F_b$ denotes the restoring force of the rack bar assembly 210, R denotes the reduction ratio of the reducer, $F_{road}$ denotes the rack force of the rack bar assembly 210, $F_{fric}$ denotes the frictional force of the rack bar assembly 210, M denotes the mass of the rack bar assembly 210, and a denotes the acceleration of the rack bar assembly 210.

The second processor 290 may provide the communication signals corresponding to the rack force to the second communication interface 280 to transmit the rack force to the steering wheel actuator 100 via the communication network NT.

As described above, the steering wheel actuator 100 may acquire the driver's steering intention through the steering wheel assembly 110 and transmit the target position corresponding to the steering intention to the steering rack actuator 200. The steering rack actuator 200 may move the rack bar assembly 210 to the target position and transmit the rack force applied to the rack bar assembly 210 from the outside to the steering wheel actuator 100. The steering wheel actuator 100 may provide the feedback torque corresponding to the rack force to the driver through the steering wheel assembly 110.

As described above, the rack force $F_{road}$ may be acquired by the restoring force $F_b$, the reduction ratio R, the frictional force $F_{fric}$, the mass M, and the acceleration a of the rack bar assembly 210.

Here, the restoring force, the reduction ratio, the mass, and the acceleration of the rack bar assembly 210 may not be greatly affected by the passage of time or external factors.

On the other hand, the frictional force may vary depending on a temperature of the rack bar assembly 210 and/or a traveling distance of the vehicle. For example, a viscosity of a lubricant for smoothly moving the rack bar assembly 210 may increase in a low-temperature environment, thereby increasing the frictional force $F_{fric}$ of the rack bar assembly. In addition, foreign substances may flow into the rack bar assembly 210, and the frictional force $F_{fric}$ of the rack bar assembly may increase due to the foreign substances.

Due to the increase in the frictional force, the equation of motion of the rack bar assembly 210 may be changed as expressed in Equation 3.

$$F_b \times R = F_{road\_real} + F_{fric} + F_{fric\_add} + Ma \quad \text{[Equation 3]}$$

Here, $F_b$ denotes the restoring force of the rack bar assembly 210, R denotes the reduction ratio of the reducer, $F_{road\_real}$ denotes an actual rack force of the rack bar assembly 210, $F_{fric}$ denotes the predetermined frictional force of the rack bar assembly 210, $F_{fric\_add}$ denotes the increased frictional force of the rack bar assembly 210, M denotes the mass of the rack bar assembly 210, and a denotes the acceleration of the rack bar assembly 210.

In addition, as expressed in Equation 2, the rack force of the rack bar assembly 210 may be acquired by subtracting the predetermined frictional force and the inertia force from the product of the restoring force and the reduction ratio.

When the frictional force increases, the rack force of the rack bar assembly 210 may be acquired by Equation 4.

$$F_{road\_esti} = F_b \times R - F_{fric} - Ma + F_{fric\_add} = \quad \text{[Equation 4]}$$
$$F_{road\_real} + F_{fric\_add}$$

Here, $F_{road\_esti}$ denotes the estimated rack force of the rack bar assembly 210, $F_b$ denotes a restoring force of the rack bar assembly 210, R denotes the reduction ratio of the reducer, $F_{fric}$ denotes a predetermined frictional force of the rack bar assembly 210, $F_{fric\_add}$ denotes an increased frictional force of the rack bar assembly 210, M denotes the mass of the rack bar assembly 210, a denotes the acceleration of the rack bar assembly 210, and $F_{road\_real}$ denotes the actual rack force of the rack bar assembly 210.

When the frictional force of the rack bar assembly 210 increases, the estimated rack force $F_{road\_esti}$ of the rack bar assembly 210 may be acquired by the sum of the actual rack force $F_{road\_real}$ of the rack bar assembly 210 and the increased frictional force $F_{fric\_add}$ of the rack bar assembly 210.

As described above, due to the increase in the frictional force of the rack bar assembly 210, the rack force $F_{road\_esti}$ greater than the actual rack force $F_{road\_real}$ may be estimated, and thus the feedback torque of the steering wheel actuator 100 may be increased. Therefore, different steering feeling may be provided to the driver.

The steering apparatus 10 may identify the increase in the frictional force of the rack bar assembly 210 and the cause of the increase in the frictional force.

Figure 3:
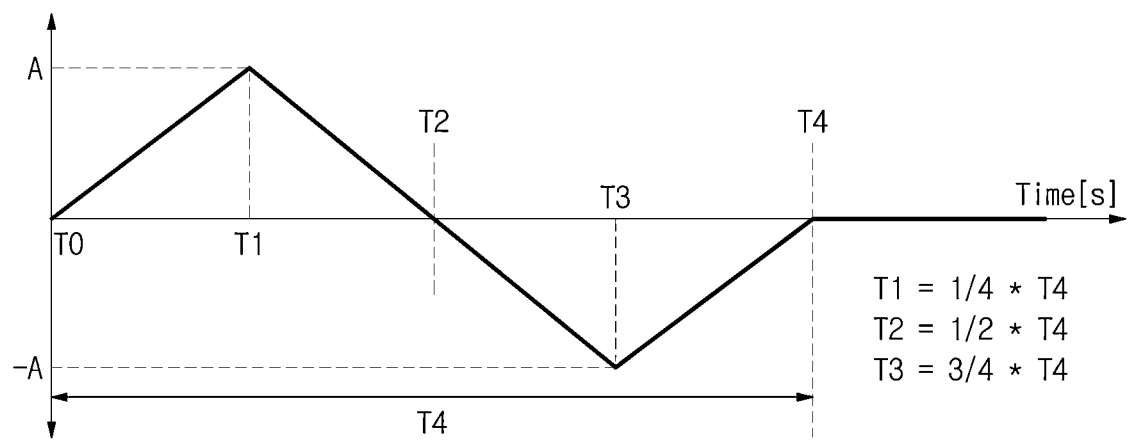
FIG. 3 is a view illustrating one example of a test signal for identifying an increase in a frictional force by the steering apparatus according to one embodiment.
Figure 4:
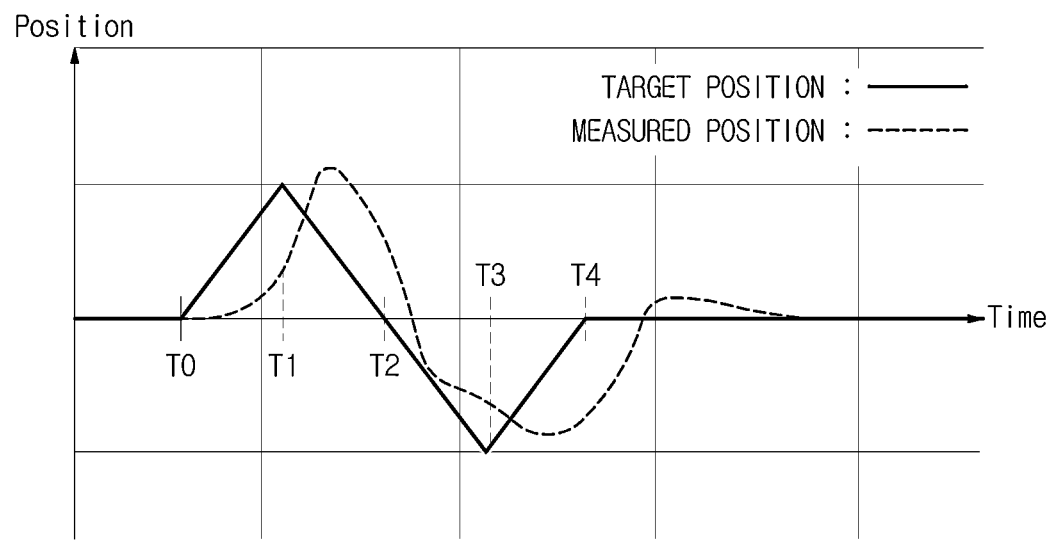
FIG. 4 is a view illustrating one example of displacement of a rack bar assembly responding to the test signal illustrated in FIG. 3.

FIG. 3 is a view illustrating one example of a test signal for identifying an increase in a frictional force by the steering apparatus according to one embodiment. FIG. 4 is a view illustrating one example of displacement of a rack bar assembly responding to the test signal illustrated in FIG. 3.

The steering rack actuator 200 may provide a test signal corresponding to a predetermined target position to the steering driver 250 and/or the steering motor 240 in order to identify the increase in the frictional force of the rack bar assembly 210.

For example, as illustrated in FIG. 3, the steering rack actuator 200 may provide a triangular test signal corresponding to a target position to the steering driver 250 and/or the steering motor 240. The target position may be changed to a triangular shape having a period of time point T4. A coordinate of the target position may linearly increase from an origin to position A between time point T0 and time point T1 (e.g., the target position may move in a left direction). The coordinate of the target position may linearly decrease from position A to position-A between time point T1 and time point T3 (e.g., the target position may move in the right direction). The target position may pass through the origin at time point T2. In addition, the target position may linearly increase to the origin between time point T3 and time point T4.

In response to the test signal including the target position illustrated in FIG. 3, the steering motor 240 may move the rack bar assembly 210 as illustrated in FIG. 4. As illustrated in FIG. 4, the measured position of the rack bar assembly 210 may follow the target position. The steering rack actuator 200 may estimate a rack force based on a difference between the measured position of the rack bar assembly 210 and the target position illustrated in FIG. 4.

A rack force corresponding to the target position illustrated in FIG. 3 at a predetermined speed and a predetermined road surface may be previously acquired by a prior experiment or the like. For example, the rack force corresponding to the target position illustrated in FIG. 3 in a state in which the vehicle has been stopped on asphalt may be acquired in advance by an experiment.

The sum (hereinafter referred to as "reference rack force value") of a maximum value of the previously acquired rack force at the predetermined speed and the predetermined road surface and an allowable error may be stored in the second memory 291 of the second processor 290. For example, the previously acquired reference rack force value in the state in which the vehicle has been stopped on asphalt may be previously stored in the second memory 291.

The second processor 290 may provide the steering driver 250 with the steering control signal corresponding to the target position illustrated in FIG. 3 in the state in which the vehicle has been stopped on the asphalt road. The steering driver 250 may control the driving current supplied to the steering motor 240 according to the steering control signal.

The second processor 290 may identify the position, the speed, and the acceleration of the rack bar assembly 210 based on the output of the rack bar position sensor 220 and acquire the maximum value of the rack force (hereinafter referred to as "estimated rack force value") using the equation of motion.

The second processor 290 may compare the estimated rack force value acquired using the equation of motion with the reference rack force value stored in the second memory 291. The reference rack force value may represent the sum of the previously acquired maximum value of the rack force and the allowable error, and the estimated rack force value may represent the sum of the maximum value of the actual rack force and the increased frictional force. Therefore, the comparison between the estimated rack force value and the reference rack force value may represent a comparison between the increased frictional force and the allowable error.

The second processor 290 may identify whether the measured rack force value is greater than the reference rack force value. That is, the second processor 290 may identify whether the increase in the frictional force is greater than the allowable error.

The second processor 290 may identify that the frictional force of the rack bar assembly 210 has increased based on the measured rack force value greater than the reference rack force value.

Figure 5:
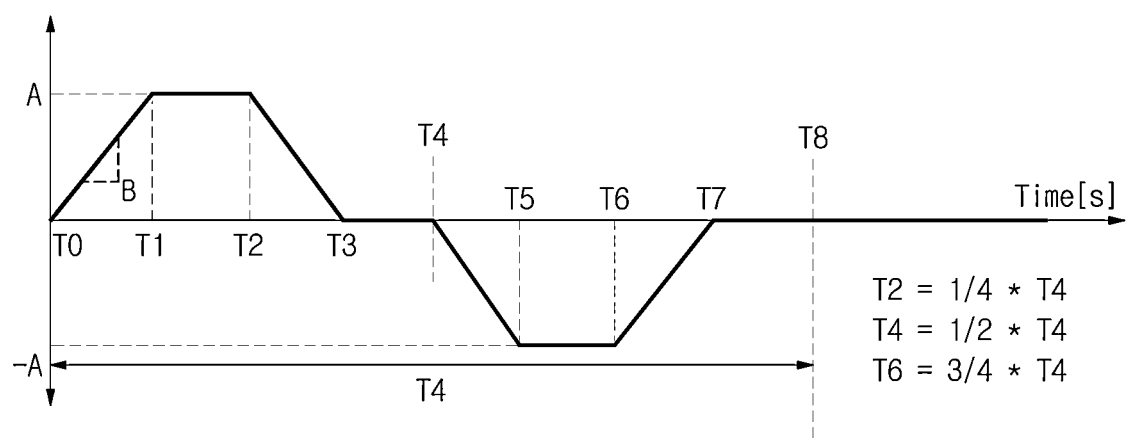
FIG. 5 is a view illustrating another example of the test signal for identifying the increase in the frictional force by the steering apparatus according to one embodiment.

FIG. 5 is a view illustrating another example of the test signal for identifying the increase in the frictional force by the steering apparatus according to one embodiment.

The test signal provided by the steering apparatus 10 to the steering motor 240 to identify the increase in the frictional force of the rack bar assembly 210 is not limited to the test signal illustrated in FIG. 3.

For example, as illustrated in FIG. 5, the steering apparatus 10 may provide a trapezoidal test signal including a target position to the steering rack actuator 200. The target position may be changed to a trapezoidal shape with a cycle of time point T8. A coordinate of the target position may linearly increase from an origin to position A between time point T0 and time point T1 (e.g., the target position may move in a left direction). The coordinate of the target position may maintain position A between time point T1 and time point T2. The target position may linearly decrease from position A to the origin between time point T2 and time point T3 (e.g., the target position may move in the right direction). The target position may maintain the origin between time point T3 and time point T4. The target position may linearly decrease from the origin to position-A between time point T4 and time point T5. The target position may maintain position-A between time point T5 and time point T6. The target position may increase linearly from position-A to the origin between time point T6 and time point T7. In addition, the target position may maintain the origin between time point T7 and time point T8.

A rack force corresponding to the target position illustrated in FIG. 5 at a predetermined speed and a predetermined road surface may be previously acquired by a prior experiment or the like, and the sum (hereinafter referred to as "reference rack force value") of the maximum value of the previously acquired rack force and the allowable error may be previously stored in the second memory 291 of the second processor 290. In addition, the second processor 290 may identify that the frictional force of the rack bar assembly 210 has increased based on the measured rack force value greater than the reference rack force value.

The steering apparatus 10 may also identify the increase in the frictional force of the steering wheel assembly 110 and the cause of the increase in the frictional force.

The steering apparatus 10 may provide the feedback motor 140 with the test signal corresponding to the predetermined target position in order to identify the increase in the frictional force of the steering wheel assembly 110.

For example, the first processor 190 may provide the steering driver 250 with the triangular test signal corresponding to the target position and/or the steering motor 240 as illustrated in FIG. 3 or provide the feedback driver 150 and/or the feedback motor 140 with the trapezoidal test signal corresponding to the target position as illustrated in FIG. 5.

The feedback motor 140 may provide the feedback torque to the steering wheel assembly 110 in response to the test signal of the first processor 190, and the steering wheel assembly 110 may be rotated by the feedback torque.

The first processor 190 may identify the feedback torque applied to the steering wheel assembly 110 based on the driving current supplied to the feedback motor 140. In addition, the feedback torque applied to the steering wheel assembly 110 in response to the test signal may be acquired by a prior experiment. The sum (hereinafter referred to as "reference feedback torque value") of the previously acquired maximum value of the feedback torque and the allowable error may be previously stored in the first memory 191 of the first processor 190.

The angle sensor 120 may measure the rotation angle of the steering wheel assembly 110 and provide the electrical signal corresponding to the measured rotation angle to the first processor 190. The first processor 190 may identify the rotation angle, a rotation rate, and a rotation angular acceleration of the steering wheel assembly 110 based on the output signal of the angle sensor 120.

The first processor 190 may acquire the feedback torque of the steering wheel assembly 110 from the rotation angle, the rotation rate, and the rotation angular acceleration of the steering wheel assembly 110 using an equation of rotation motion.

The maximum value of the feedback torque (hereinafter referred to as "estimated feedback torque value") acquired by the equation of the motion of the steering wheel assembly 110 may include the maximum value of the feedback torque applied to the steering wheel assembly 110 and the increased frictional force of the steering wheel assembly 110.

The first processor 190 may compare the estimated feedback torque value with the reference feedback torque value stored in the first memory 191. The estimated feedback torque value may represent a maximum value of an actual feedback torque and the increased frictional force, and the reference feedback torque value may represent the sum of the previously acquired maximum value of the feedback torque and the allowable error. Therefore, the comparison between the estimated feedback torque value and the reference feedback torque value may represent a comparison between the increased friction and the allowable error.

The first processor 190 may identify whether the estimated feedback torque value is greater than the reference feedback torque value. That is, the first processor 190 may identify whether the increase in the frictional force is greater than the allowable error.

The first processor 190 may identify that the frictional force of the steering wheel assembly 110 has increased based on the estimated feedback torque value greater than the reference feedback torque value.

As described above, the steering rack actuator 200 may identify that the frictional force of the rack bar assembly 210 has increased based on the measured rack force value greater than the reference rack force value and also identify that the frictional force of the steering wheel assembly 110 has increased based on the estimated feedback torque value greater than the reference feedback torque value.

The steering apparatus 10 may identify the cause of the increase in the frictional force based on whether the frictional force of the rack bar assembly 210 has increased and whether the frictional force of the steering wheel assembly 110 has increased.

For example, when the increase in the frictional force of the rack bar assembly 210 is identified and the increase in the frictional force of the steering wheel assembly 110 is identified, at least one of the first processor 190 or the second processor 290 may identify the increase in the frictional force due to a low temperature. Therefore, the steering apparatus 10 may output a message warning of a low temperature through an output device such as a display or the like of a vehicle.

For example, when the increase in the frictional force of the rack bar assembly 210 is identified and the increase in the frictional force of the steering wheel assembly 110 is not identified, at least one of the first processor 190 or the second processor 290 may identify that the increase in the frictional force is due to the introduction of foreign substances into the rack bar assembly 210. Therefore, the steering apparatus 10 may output a message guiding the driver to check the rack bar assembly 210 through the display or the like of the vehicle. In addition, the steering apparatus 10 may output a message warning the driver of the introduction of foreign substances into the rack bar assembly 210 through the display or the like of the vehicle.

For example, when the increase in the frictional force of the rack bar assembly 210 is not identified and the increase in the frictional force of the steering wheel assembly 110 is identified, at least one of the first processor 190 or the second processor 290 may identify the increase in the frictional force of the steering wheel assembly 110 due to a mechanical defect of the steering wheel assembly 110. Therefore, the steering apparatus 10 may output a message guiding the driver to check the steering wheel assembly 110 through the display or the like of the vehicle. In addition, the steering apparatus 10 may output a message warning the driver of the mechanical defect of the steering wheel assembly 110 through the display or the like of the vehicle.

For example, when the increase in the frictional force of the rack bar assembly 210 is not identified and the increase in the frictional force of the steering wheel assembly 110 is not identified, at least one of the first processor 190 or the second processor 290 may identify that an operation of the steering apparatus 10 is normal.

As described above, the steering apparatus 10 may identify the increase in the frictional forces of the rack bar assembly 210 and/or the steering wheel assembly 110 and identify the causes of the increase in the frictional forces.

Therefore, the steering apparatus 10 may provide the driver with an accurate state of the steering apparatus 10 so that the driver may easily maintain the steering apparatus 10 according to the causes of the increase in the frictional forces.

The above description has been made that the steering apparatus 10 includes the steering wheel actuator 100 and the steering rack actuator 200, and the steering wheel actuator 100 and the steering rack actuator 200 respectively include the first processor 190 and the second processor 290.

However, the control configuration of the steering apparatus 10 is not limited to the control configuration illustrated in FIGS. 1 and 2.

Figure 6:
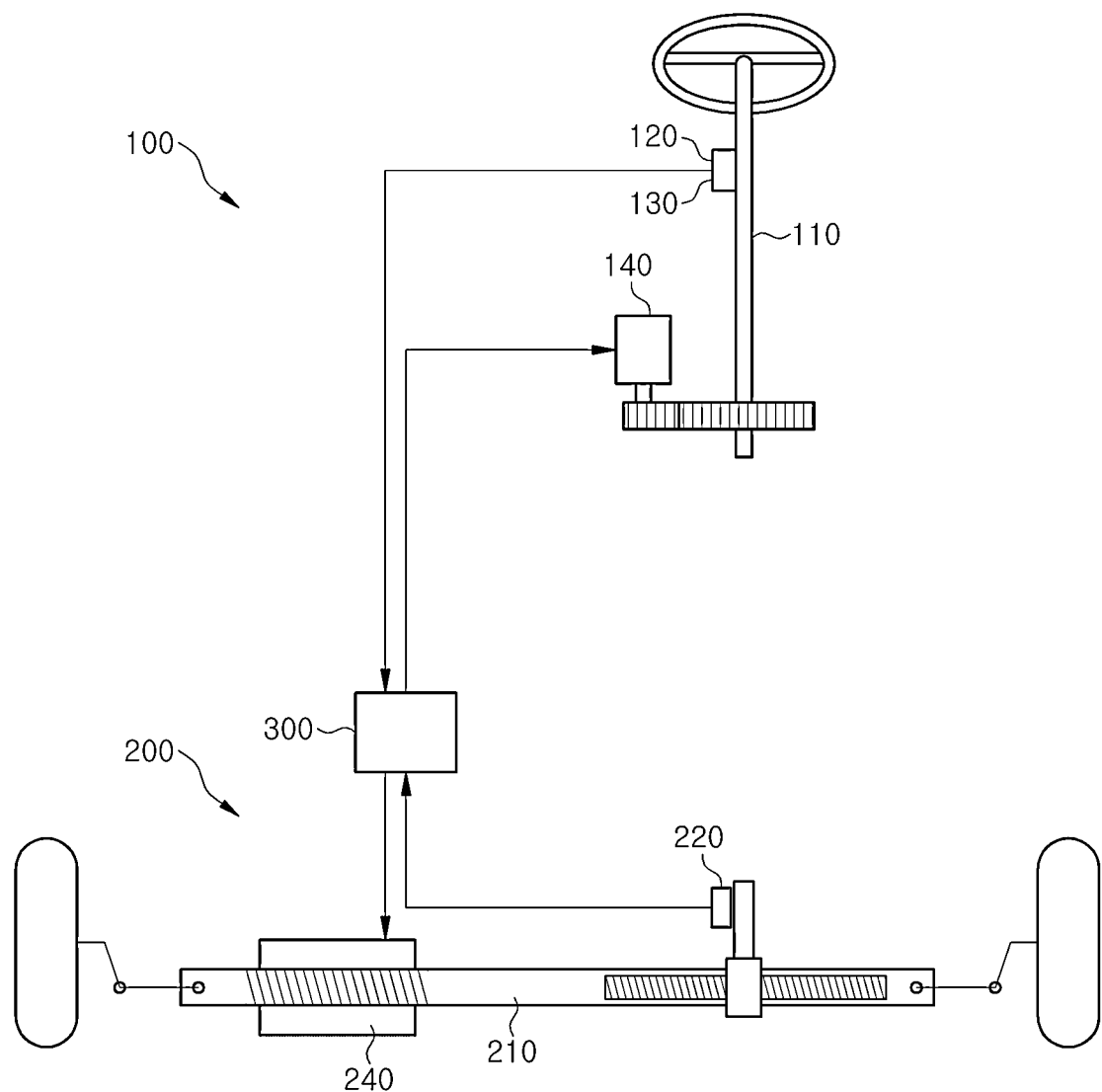
FIG. 6 is a view illustrating one example of a steering apparatus according to one embodiment.
Figure 7:
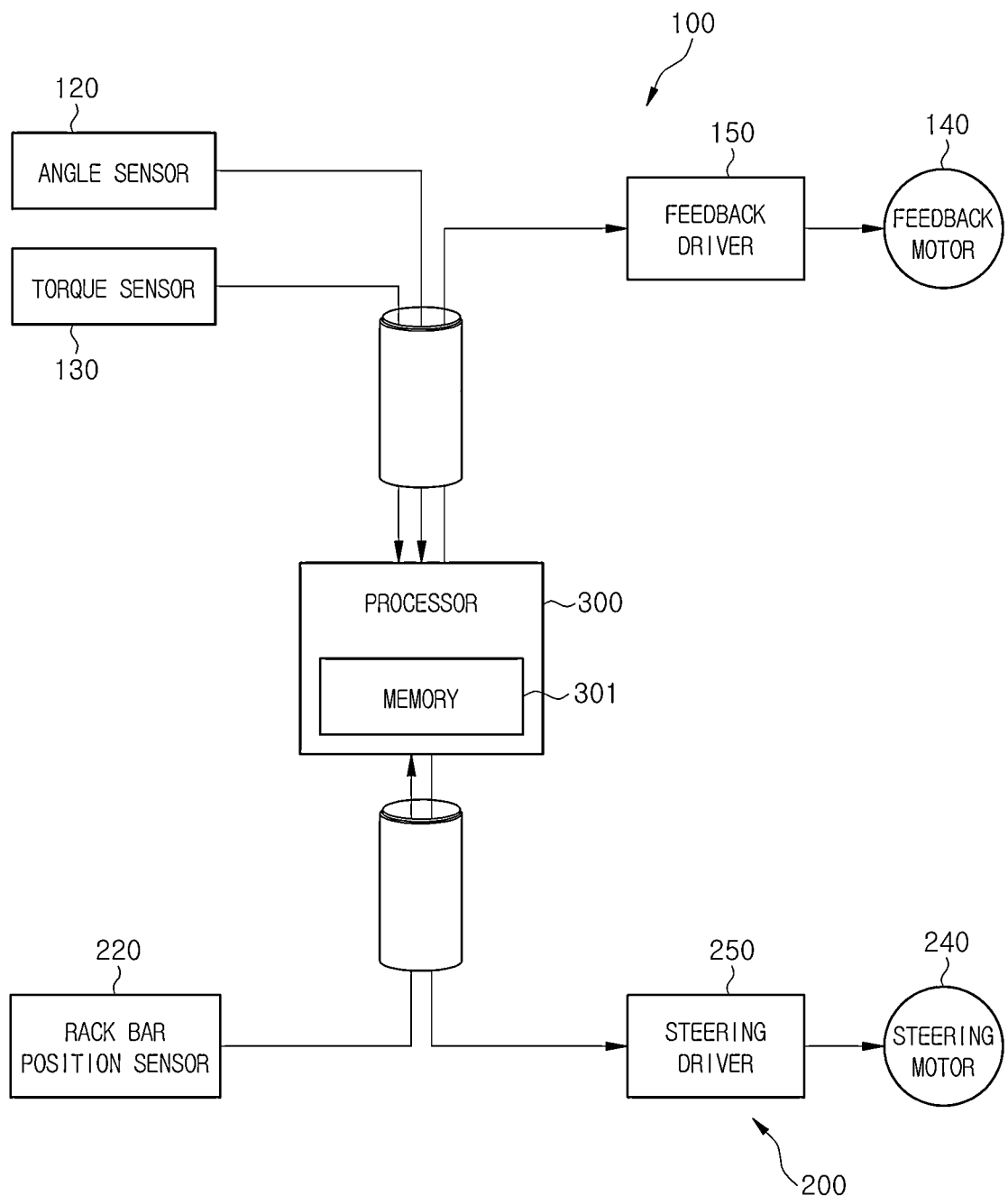
FIG. 7 is a view illustrating one example of a control configuration of the steering apparatus according to one embodiment.

FIG. 6 is a view illustrating one example of a steering apparatus according to one embodiment. FIG. 7 is a view illustrating one example of a control configuration of the steering apparatus according to one embodiment.

Referring to FIGS. 6 and 7, the steering apparatus 10 may include the steering wheel actuator 100, the steering rack actuator 200, and a processor 300.

The steering wheel actuator 100 may acquire the driver's steering intention through the steering wheel and provide the steering wheel with the feedback torque corresponding to the rack force acting on the wheels of the vehicle.

The steering wheel actuator 100 may include the steering wheel assembly 110, the angle sensor 120, the torque sensor 130, the feedback motor 140, and the feedback driver 150. The steering wheel assembly 110, the angle sensor 120, the torque sensor 130, the feedback motor 140, and the feedback driver 150 do not correspond to essential components of the steering wheel actuator 100, and at least some thereof may be omitted. In addition, the steering wheel assembly 110, the angle sensor 120, the torque sensor 130, the feedback motor 140, and the feedback driver 150 may be respectively the same as the steering wheel assembly, the angle sensor, the torque sensor, the feedback motor, and the feedback driver illustrated in FIGS. 1 and 2.

The steering rack actuator 200 may move the rack bar to steer the vehicle according to the driver's steering intention and identify the rack force applied to the rack bar.

The steering rack actuator 200 may include the rack bar assembly 210, the steering motor 240, the steering driver 250, and the rack bar position sensor 220. The rack bar assembly 210, the steering motor 240, the steering driver 250, and the rack bar position sensor 220 do not correspond to essential components of the steering rack actuator 200, and at least some thereof may be omitted. In addition, the rack bar assembly 210, the steering motor 240, the steering driver 250, and the rack bar position sensor 220 may be the same as the rack bar assembly, the steering motor, the steering driver, and the rack bar position sensor illustrated in FIGS. 1 and 2.

The processor 300 may be coupled to the steering wheel actuator 100 or the steering rack actuator 200. In addition, the processor 300 may be physically separated from both the steering wheel actuator 100 and the steering rack actuator 200.

The processor 300 may be electrically connected to the steering wheel actuator 100 and the steering rack actuator 200.

The processor 300 may control the operation of the steering apparatus 10. For example, the processor 300 may perform the roles of the first processor and the second processor illustrated in FIGS. 1 and 2. In addition, the processor 300 may include a memory 301 for storing programs and data in order to implement the control of the operation of the steering apparatus 10.

The processor 300 may process the angle signal of the angle sensor 120 and/or the torque signal of the torque sensor 130 and identify the driver's steering intention based on a result of processing the angle signal and/or the torque signal. The processor 300 may identify the target position of the rack bar corresponding to the driver's steering intention and provide the steering control signal corresponding to the target position to the steering driver 250. The steering driver 250 may control the driving current supplied to the steering motor 240 so that the rack bar assembly 210 follows the target position.

The processor 300 may process the position signal of the rack bar position sensor 220 and identify the rack force based on a result of processing the position signal. The processor 300 may identify the feedback torque corresponding to the rack force and provide the feedback control signal corresponding to the feedback torque to the feedback driver 150. The feedback driver 150 may control the driving current supplied to the feedback motor 140 to apply the feedback torque to the steering wheel assembly 110.

The processor 300 may identify the increase in the frictional forces of the rack bar assembly 210 and/or the steering wheel assembly 110 and the causes of the increase in the frictional forces.

The processor 300 may provide the steering rack actuator 200 with a first test signal corresponding to the predetermined target position and identify the estimated rack force value based on the output signal of the rack bar position sensor 220. The processor 300 may compare the estimated rack force value with a reference rack force value previously stored in the memory 301 and identify that the frictional force of the rack bar assembly 210 has increased based on the estimated rack force value greater than the reference rack force value.

The processor 300 may provide the steering wheel assembly 110 with a second test signal corresponding to the predetermined feedback torque and identify the estimated feedback torque value based on the output signal of the angle sensor 120. The processor 300 may compare the estimated feedback torque value with the reference feedback torque value previously stored in the memory 301 and identify that the frictional force of the steering wheel assembly 110 has increased based on the estimated feedback torque value greater than the reference feedback torque value.

When the processor 300 identifies the increase in the frictional force of the rack bar assembly 210 and identifies the increase in the frictional force of the steering wheel assembly 110, the steering apparatus 10 may identify the increase in the frictional force due to a low temperature.

When the processor 300 identifies the increase in the frictional force of the rack bar assembly 210 and identifies no increase in the frictional force of the steering wheel assembly 110, the steering apparatus 10 may identify the increase in the frictional force of the rack bar assembly due to the introduction of foreign substances into the rack bar assembly 210.

When the processor 300 identifies no increase in the frictional force of the rack bar assembly 210 and identifies the increase in the frictional force of the steering wheel assembly 110, the steering apparatus 10 may identify the increase in the frictional force of the steering wheel assembly 110 due to the mechanical defect of the steering wheel assembly 110.

When the processor 300 identifies no increase in the frictional force of the rack bar assembly 210 and identifies no increase in the frictional force of the steering wheel assembly 110, the steering apparatus 10 may identify that it is in the normal operation state.

Figure 8:
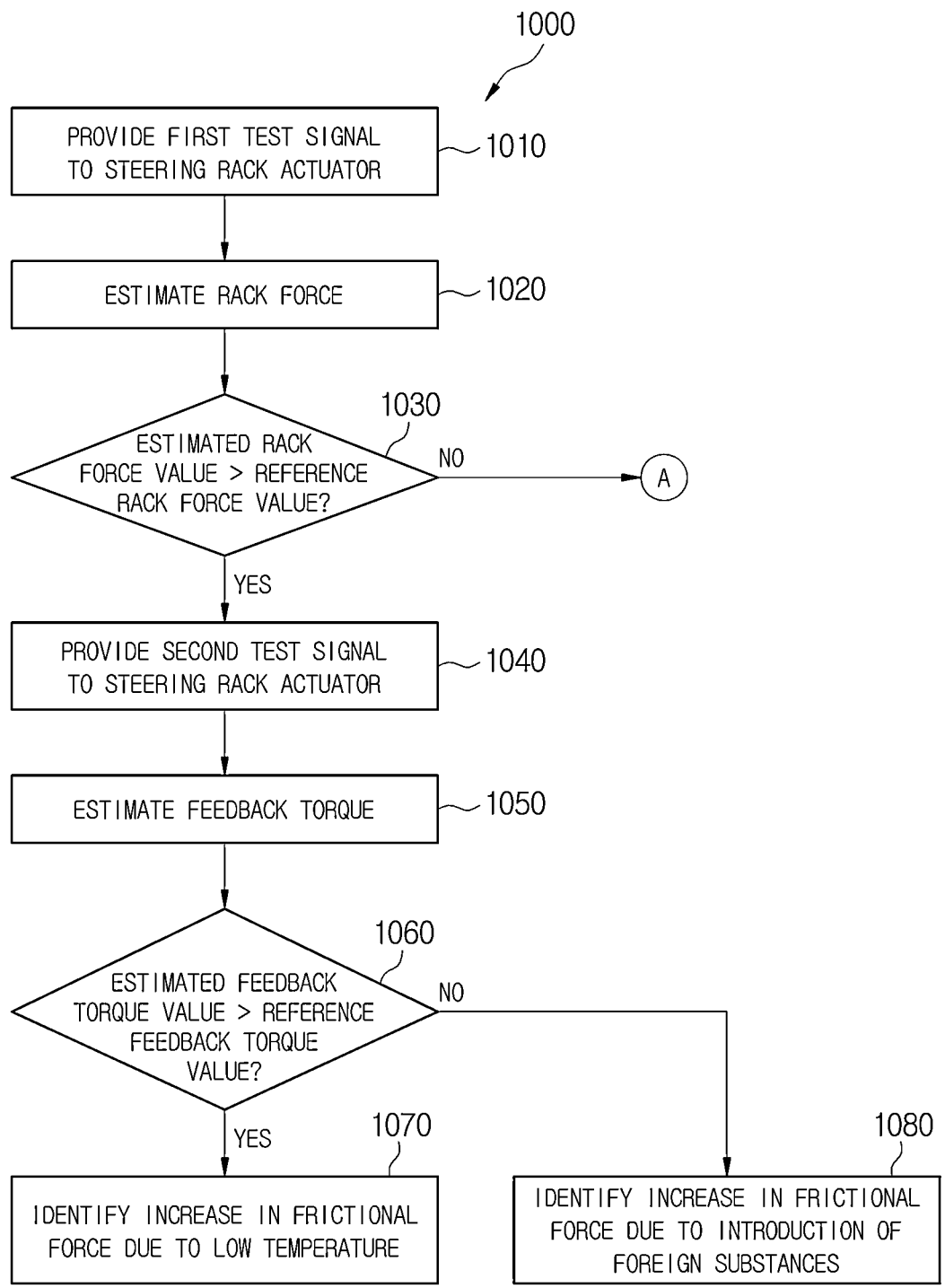
FIGS. 8 and 9 are views illustrating a method in which the steering apparatus identifies an increase in a frictional force and the cause of the increase in the frictional force.
Figure 9:
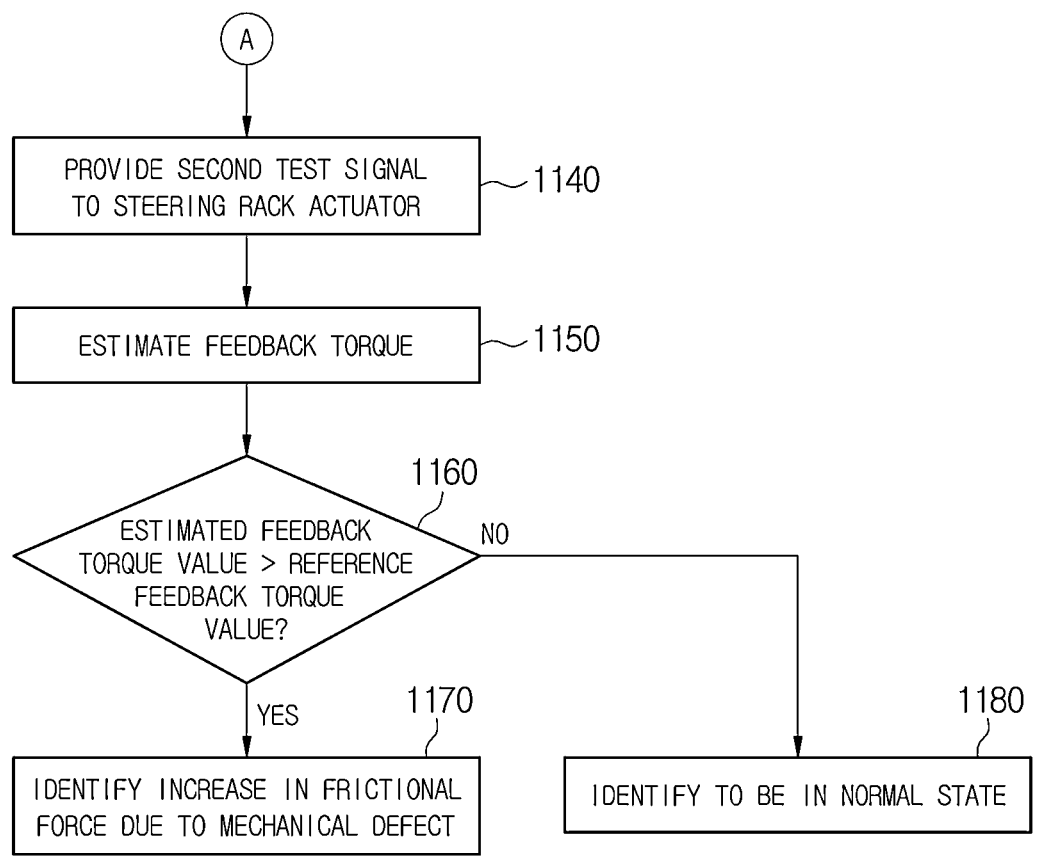

FIGS. 8 and 9 are views illustrating a method in which the steering apparatus identifies an increase in a frictional force and the cause of the increase in the frictional force.

A method 1000 in which the steering apparatus 10 identifies the increase in the frictional forces and the causes of the increase in the frictional forces will be described with reference to FIGS. 8 and 9.

Operations to be described below do not correspond to essential operations of the method 1000 in which the steering apparatus 10 identifies the increase in the frictional forces and the causes of the increase in the frictional forces, and at least some of the operations may be omitted.

The steering apparatus 10 may provide the first test signal to the steering rack actuator 200 (1010).

For example, the processor 290 or 300 may provide the first test signal corresponding to the predetermined target position to the steering driver 250. The steering driver 250 may control the driving current supplied to the steering motor 240 to move the rack bar assembly 210 according to the first test signal.

The steering apparatus 10 may estimate the rack force of the rack bar assembly 210 (1020).

For example, the processor 290 or 300 may identify the maximum value of the rack force (hereinafter referred to as "estimated rack force value") applied to the rack bar assembly 210 based on the output signal of the rack bar position sensor 220.

The steering apparatus 10 may identify whether the estimated rack force value is greater than the reference rack force value (1030).

For example, the processor 290 or 300 may previously store the maximum value of the rack force (hereinafter referred to as "reference rack force value") corresponding to the first test signal. The processor 290 or 300 may compare the estimated rack force value with the reference rack force value and identify whether the estimated rack force value is greater than the reference rack force value.

When it is identified that the estimated rack force value is greater than the reference rack force value (YES in 1030), the steering apparatus 10 may provide the second test signal to the steering wheel actuator 100 (1040).

For example, the processor 190 or 300 may provide the feedback driver 150 with the second test signal corresponding to the predetermined feedback torque. The feedback driver 150 may control the driving current supplied to the feedback motor 140 to provide the feedback torque according to the second test signal.

The steering apparatus 10 may estimate the feedback torque of the steering wheel assembly 110 (1050).

For example, the processor 190 or 300 may identify the maximum value of the feedback torque (hereinafter referred to as "estimated feedback torque value") applied to the steering wheel assembly 110 based on the output signal of the angle sensor 120.

The steering apparatus 10 may identify whether the estimated feedback torque value is greater than the reference feedback torque value (1060).

For example, the processor 190 or 300 may previously store the maximum value of the feedback torque (hereinafter referred to as "reference feedback torque value") corresponding to the second test signal. The processor 190 or 300 may compare the estimated feedback torque value with the reference feedback torque value and identify whether the estimated feedback torque value is greater than the reference feedback torque value.

When it is identified that the estimated feedback torque value is greater than the reference feedback torque value (YES in 1060), the steering apparatus 10 may identify the increase in the frictional force due to the low temperature (1070).

For example, the processor 190, 290, or 300 may identify the increase in the frictional force due to the low temperature based on identification of the increase in the frictional force of the rack bar assembly 210 and identification of the increase in the frictional force of the steering wheel assembly 110.

When identifying the increase in the frictional force due to the low temperature, the steering apparatus 10 may output the message representing the increase in the frictional force of the steering apparatus 10 due to the low temperature through the display (e.g., a cluster or a navigation display) of the vehicle or a speaker of the vehicle.

In addition, when identifying the increase in the frictional force due to the low temperature, the steering apparatus 10 may provide a diagnostic device of the vehicle with the message representing the increase in the frictional force of the steering apparatus 10 due to the low temperature.

When it is identified that the estimated feedback torque value is not greater than the reference feedback torque value (NO in 1060), the steering apparatus 10 may identify the increase in the frictional force of the steering rack actuator 200 due to the introduction of foreign substances (1080).

For example, the processor 190, 290, or 300 may identify the increase in the frictional force of the rack bar assembly 210 due to the introduction of foreign substances into the rack bar assembly 210 based on identification of the increase in the frictional force of the rack bar assembly 210 and identification of the increase in the frictional force of the steering wheel assembly 110.

When identifying the increase in the frictional force due to the low temperature, the steering apparatus 10 may output the message representing the increase in the frictional force of the rack bar assembly 210 due to the introduction of foreign substances through the display (e.g., a cluster or a navigation display) of the vehicle or the speaker of the vehicle.

In addition, when identifying the increase in the frictional force due to the low temperature, the steering apparatus 10 may provide the diagnostic device of the vehicle with the message representing the increase in the frictional force of the rack bar assembly 210 due to the introduction of foreign substances.

When it is identified that the estimated rack force value is not greater than the reference rack force value (NO in 1030), the steering apparatus 10 may provide the second test signal to the steering wheel actuator 100 (1140), estimate the feedback torque of the steering wheel assembly 110 (1150), and identify whether the estimated feedback torque value is greater than the reference feedback torque value (1160).

Operations 1140, 1150, and 1160 may be the same as operations 1040, 1050, and 1060, respectively.

When it is identified that the estimated feedback torque value is greater than the reference feedback torque value (YES in 1160), the steering apparatus 10 may identify the increase in the frictional force of the steering wheel assembly 110 due to the mechanical defect (1170).

For example, the steering apparatus 10 may identify the increase in the frictional force of the steering wheel assembly 110 due to the mechanical defect of the steering wheel assembly 110 based on the processor 190, 290, or 300 that identify that there are no increase in the frictional force of the rack bar assembly 210 and the increase in the frictional force of the steering wheel assembly 110.

When identifying the increase in the frictional force due to the low temperature, the steering apparatus 10 may output the message representing the increase in the frictional force of the steering wheel assembly 110 due to the mechanical defect through the display (e.g., a cluster or a navigation display) of the vehicle or the speaker of the vehicle.

In addition, when identifying the increase in the frictional force due to the low temperature, the steering apparatus 10 may provide the diagnostic device of the vehicle with the message representing the increase in the frictional force of the steering wheel assembly 110 due to the mechanical defect.

When it is identified that the estimated feedback torque value is not greater than the reference feedback torque value (NO in 1160), the steering apparatus 10 may identify that it is in a normal operation state (1180).

For example, the steering apparatus 10 may identify that the steering apparatus 10 is in the normal operation state based on the processors 190, 290, and 300 that identify that there are no increase in the frictional force of the rack bar assembly 210 and the increase in the frictional force of the steering wheel assembly 110.

As described above, the steering apparatus 10 may identify the increase in the frictional forces of the rack bar assembly 210 and/or the steering wheel assembly 110 and the causes of the increase in the frictional forces based on the estimated rack force value and the estimated feedback torque value.

Therefore, the steering apparatus 10 may provide the driver with the accurate state of the steering apparatus 10 so that the driver may easily maintain the steering apparatus 10 according to the causes of the increase in the frictional forces.

As is apparent from the above description, it is possible to provide a steering apparatus capable of detecting changes in frictional forces between internal members and a method of controlling the same. Therefore, the steering apparatus can allow a driver to feel the same steering feeling as at the time of an initial use of the steering apparatus.

Meanwhile, disclosed embodiments may be implemented in the form of a recording medium in which instructions executable by a computer are stored. The instructions may be stored in the form of a program code, and when executed by a processor, program modules are generated to perform operations of the disclosed embodiments. The recording medium may be implemented as a computer-readable recording medium.

The computer-readable recording medium includes any type of recording media in which instructions that can be decoded by a computer are stored. For example, there may be a ROM, a RAM, a magnetic tape, a magnetic disk, a flash memory, an optical data storage device, etc.

A device-readable storage medium may be provided in the form of a non-transitory storage medium. Here, "non-transitory storage medium" is a tangible device and only means not including a signal (e.g., electromagnetic waves), and this term does not distinguish between cases in which data is stored semi-permanently and temporarily in the storage medium. For example, "non-temporary storage medium" may include a buffer in which data is temporarily stored.

As described above, the disclosed embodiments have been described with reference to the accompanying drawings. Those skilled in the art to which the present disclosure pertains will understand that the present disclosure can be carried out in the form different from those of the disclosed embodiments even without changing the technical spirit or essential features of the present disclosure. The disclosed embodiments are illustrative and should not be construed as being limited.

What is claimed is:

1. A steering apparatus comprising:
a feedback motor including a rotation shaft connected to a steering wheel provided in a vehicle;
an angle sensor configured to output an angle signal corresponding to a rotation displacement of the steering wheel;
a steering motor including a rotation shaft connected to a rack bar provided in the vehicle;
a position sensor configured to output a position signal corresponding to a linear displacement of the rack bar; and
at least one processor configured to:
control the steering motor to linearly move the rack bar based on predetermined target positions,
identify a rack force applied to the rack bar based on the position signal of the position sensor,
control the feedback motor based on a predetermined feedback torque;
identify a feedback torque applied to the steering wheel based on the angle signal of the angle sensor, and
provide an output device of the vehicle with an electrical signal indicating whether an increase in a frictional force of at least one of the rack bar or the steering wheel occurs based on the identified rack force and the identified feedback torque.

2. The steering apparatus of claim 1, wherein the at least one processor is configured to:
identify the increase in the frictional force of the rack bar based on the identified rack force being greater than a predetermined reference rack force; and
identify the increase in the frictional force of the steering wheel based on the identified feedback torque being greater than a predetermined reference feedback torque.

3. The steering apparatus of claim 1, wherein the at least one processor is configured to provide the electrical signal to the output device to output a message warning of a low temperature causing the increases in the frictional forces of the rack bar and the steering wheel based on the identified rack force being greater than a predetermined reference rack force and the identified feedback torque being greater than a predetermined reference feedback torque.

4. The steering apparatus of claim 1, wherein the at least one processor is configured to provide the electrical signal to the output device to output a message warning of introduction of foreign substances into the rack bar based on the identified rack force being greater than a predetermined reference rack force and the identified feedback torque being not greater than a predetermined reference feedback torque.

5. The steering apparatus of claim 1, wherein the at least one processor is configured to provide the electrical signal to the output device to output a message warning of a mechanical defect of the steering wheel based on the identified rack force being not greater than a predetermined reference rack force and the identified feedback torque being greater than a predetermined reference feedback torque.

6. The steering apparatus of claim 1, wherein the at least one processor is configured to identify a normal operation of the steering apparatus based on the identified rack force being not greater than a predetermined reference rack force and the identified feedback torque being not greater than a predetermined reference feedback torque.

7. The steering apparatus of claim 1, wherein the predetermined target positions comprise target positions whose displacements from an origin change in a form of a triangular or trapezoidal, and
the predetermined feedback torque comprises a feedback torque whose magnitude changes in a form of a triangular or trapezoidal.

8. The steering apparatus of claim 1, wherein the at least one processor comprises:
a first processor electrically connected to the feedback motor and the angle sensor; and
a second processor electrically connected to the steering motor and the position sensor, and
the first processor is configured to communicate with the second processor.

9. A method of controlling a steering apparatus including a steering wheel provided in a vehicle and a rack bar connected to a rotation shaft of the wheel provided in the vehicle, the method comprising:
controlling a linear movement of the rack bar based on predetermined target positions;
identifying a rack force applied to the rack bar based on a position signal of a position sensor, the position sensor configured to output the position signal corresponding to a linear displacement of the rack bar;
controlling rotation of the steering wheel based on a predetermined feedback torque;
identifying a feedback torque applied to the steering wheel based on an angle signal of an angle sensor, the angle sensor configured to output the angle signal corresponding to a rotation displacement of the steering wheel; and
providing an output device of the vehicle with an electrical signal indicating whether an increase in a frictional force of at least one of the rack bar or the steering wheel occurs based on the identified rack force and the identified feedback torque.

10. The method of claim 9, wherein the providing of the electrical signal corresponding to the increase in the frictional force of the at least one of the rack bar or the steering wheel comprises:
identifying the increase in the frictional force of the rack bar based on the identified rack force being greater than a predetermined reference rack force; and
identifying the increase in the frictional force of the steering wheel based on the identified feedback torque being greater than a predetermined reference feedback torque.

11. The method of claim 9, further comprising providing the electrical signal to the output device to output a message warning of a low temperature causing the increases in the frictional forces of the rack bar and the steering wheel based on the identified rack force being greater than a predetermined reference rack force and the identified feedback torque being greater than a predetermined reference feedback torque.

12. The method of claim 9, further comprising providing the electrical signal to the output device to output a message warning of introduction of foreign substances into the rack bar based on the identified rack force being greater than a predetermined reference rack force and the identified feedback torque being not greater than a predetermined reference feedback torque.

13. The method of claim 9, further comprising providing the electrical signal to the output device to output a message warning of a mechanical defect of the steering wheel based on the identified rack force being not greater than a predetermined reference rack force and the identified feedback torque being greater than a predetermined reference feedback torque.

14. The method of claim 9, further comprising identifying that a normal operation of the steering apparatus based on the identified rack force being not greater than a predetermined reference rack force and the identified feedback torque being not greater than a predetermined reference feedback torque.

15. The method of claim 9, wherein the predetermined target positions comprise target positions whose displacements from an origin change in a form of a triangular or trapezoidal, and the predetermined feedback torque comprises a feedback torque whose magnitude changes in a form of a triangular or trapezoidal.

16. A steering apparatus comprising:

a steering wheel actuator; and a steering rack actuator, wherein the steering wheel actuator includes:

a feedback motor including a rotation shaft connected to a steering wheel provided in a vehicle;

an angle sensor configured to output an angle signal corresponding to a rotation displacement of the steering wheel; and a first processor configured to transmit a target position corresponding to the angle signal to the steering rack actuator and control a feedback motor to apply a feedback torque corresponding to a rack force of the steering wheel actuator to the steering wheel, wherein the steering rack actuator includes:

a steering motor including a rotation shaft connected to a rack bar provided in the vehicle;

a position sensor configured to output a position signal corresponding to a linear displacement of the rack bar assembly; and a second processor configured to control the steering motor to linearly move the rack bar based on the target position and identify a rack force applied to the rack bar based on the position signal, wherein the first processor is configured to control the feedback motor based on a predetermined feedback torque and provide an electrical signal indicating whether an increase in a frictional force of the steering wheel occurs to an output device of the vehicle based on a feedback torque value identified based on the angle signal, and the second processor is configured to control the steering motor based on predetermined target positions and provide an electrical signal indicating whether an increase in a frictional force of the rack bar occurs to the output device of the vehicle based on a rack force value identified based on the position signal.

17. The steering apparatus of claim 16, wherein at least one processor of the first processor or the second processor is configured to provide the electrical signal to the output device to output a message warning of a low temperature causing the increases in the frictional forces of the rack bar and the steering wheel based on the identified rack force being greater than a predetermined reference rack force and the identified feedback torque being greater than a predetermined reference feedback torque.

18. The steering apparatus of claim 16, wherein at least one processor of the first processor or the second processor is configured to provide the electrical signal to the output device to output a message warning of introduction of foreign substances into the rack bar based on the identified rack force being greater than a predetermined reference rack force and the identified feedback torque being not greater than a predetermined reference feedback torque.

19. The steering apparatus of claim 16, wherein at least one processor of the first processor or the second processor is configured to provide the electrical signal to the output device to output a message warning of a mechanical defect of the steering wheel based on the identified rack force being not greater than a predetermined reference rack force and the identified feedback torque being greater than a predetermined reference feedback torque.

20. The steering apparatus of claim 16, wherein at least one processor of the first processor or the second processor is configured to identify a normal operation of the steering apparatus based on the identified rack force being not greater than a predetermined reference rack force and the identified feedback torque being not greater than a predetermined reference feedback torque.

* * * * *